United States Patent [19]
Ross et al.

[11] Patent Number: 5,247,517
[45] Date of Patent: Sep. 21, 1993

[54] METHOD AND APPARATUS FOR ANALYZING NETWORKS

[75] Inventors: Ken Ross, Santa Cruz; Michael Margozzi, San Jose; Kevin White, Los Gatos; Carl First, San Jose, all of Calif.

[73] Assignee: Novell, Inc., Provo, Utah

[21] Appl. No.: 939,850

[22] Filed: Sep. 2, 1992

Related U.S. Application Data

[63] Continuation of Ser. No. 424,651, Oct. 20, 1989, abandoned.

[51] Int. Cl.[5] .......................... H04J 3/14; H04Q 9/00
[52] U.S. Cl. .................................... 370/85.5; 370/17; 370/85.15; 340/825.05
[58] Field of Search ............... 370/13, 60, 85.2, 85.4, 370/85.5, 85.6, 85.12, 85.15, 94.1, 17; 340/825.05, 825.06, 825.5, 825.51; 371/20.6

[56] References Cited

U.S. PATENT DOCUMENTS

| | | | |
|---|---|---|---|
| 4,652,874 | 3/1987 | Loyer | 340/825.05 |
| 4,674,086 | 6/1987 | Szczepanek et al. | 370/85.5 |
| 4,736,368 | 4/1988 | Szczepanek | 370/85.5 |
| 4,792,753 | 12/1988 | Iwai | 340/825.05 |
| 4,799,052 | 1/1989 | Near et al. | 340/825.5 |
| 4,891,639 | 1/1990 | Nakamura | 340/825.5 |
| 4,979,167 | 12/1990 | McCool | 370/85.4 |

Primary Examiner—Douglas W. Olms
Assistant Examiner—Alpus H. Hsu
Attorney, Agent, or Firm—Hecker & Harriman

[57] ABSTRACT

The present invention provides a method and apparatus for analyzing and monitoring network activity. The present invention provides one-hundred percent data capture for complete monitoring capability. The present invention also permits the simulated generation of traffic up to network capacity. The method and apparatus of the present invention allows for the use of predefined or custom-designed network tests so that users can analyze protocols and trouble-shoot network problems at various levels. Although one-hundred percent data capture is possible, the user may also customize the system to capture only certain packets of information. For example, the present invention can be implemented to capture errors, collisions and short-length packets. The present invention accesses the token ring network through a ring interface. The output of the ring interface is coupled to a media access control (MAC) block. The MAC block includes a memory for packet buffering and is coupled to the primary memory, which is coupled to the host interface. The output of the ring interface is also coupled to a serial state machine. The serial state machine is used for high speed decoding of packet information. The output of the serial state machine is coupled to a series of timers and filters tracking information from the data stream. An on-board CPU controls the timers and is coupled to the primary memory.

14 Claims, 4 Drawing Sheets

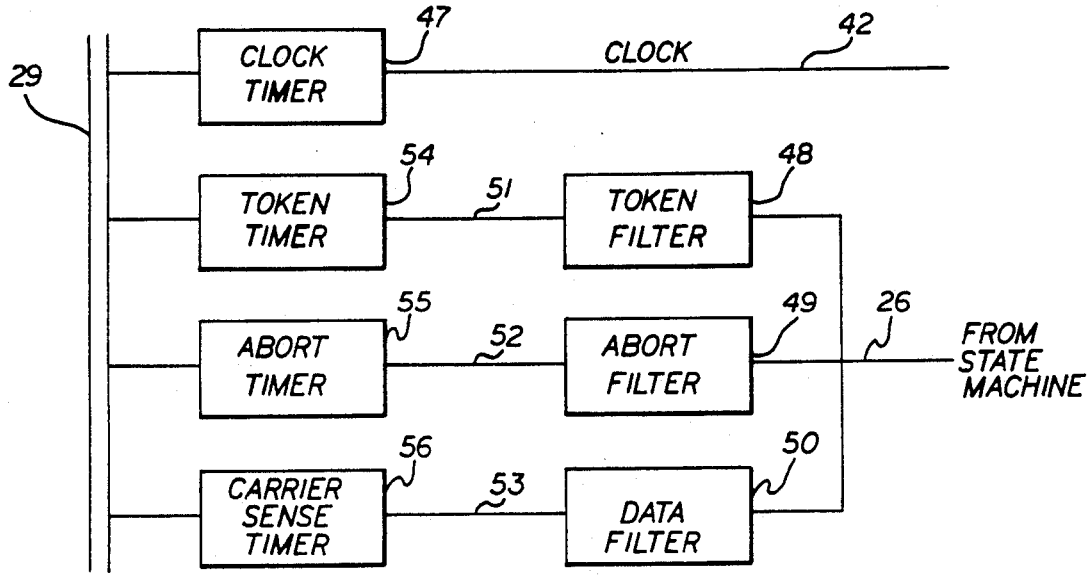
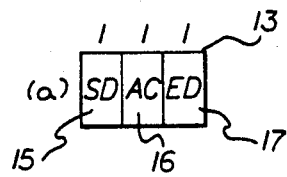
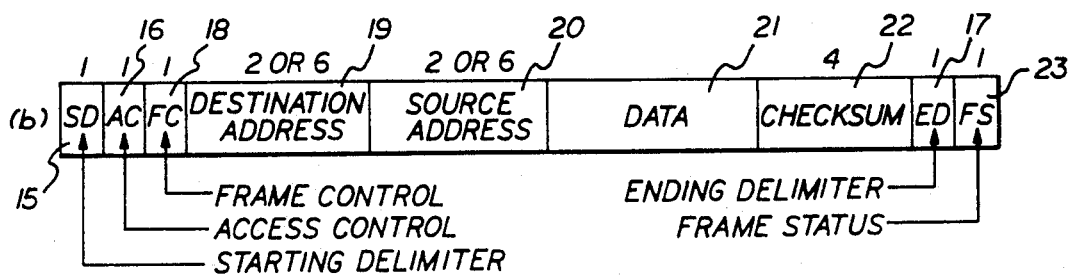

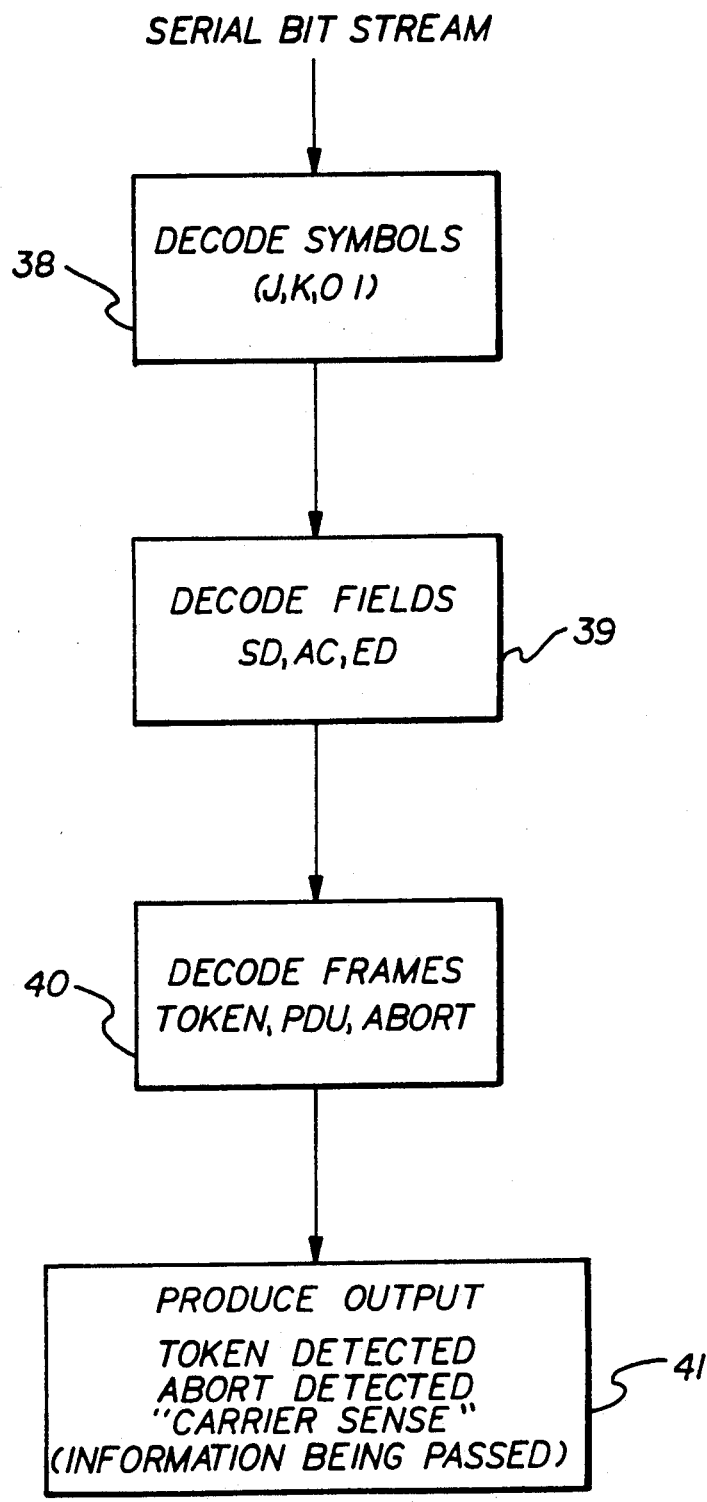

METHOD AND APPARATUS FOR ANALYZING NETWORKS

This is a continuation of application Ser. No. 424,651 filed Oct. 20, 1989, now abandoned.

BACKGROUND OF THE PRESENT INVENTION

1. Field of the Invention

This invention relates to the field of analysis devices for computer networks.

2. Background Art

A computer network is an inter-connected connection of autonomous computers. The computer network allows these computers to exchange information and share resources (i.e., files, printers, modems, storage units, etc.). The network is made up of hosts (e.g., computers) connected by a communications subnet. The subnet consists of transmission lines and may include switching elements. The subnet may be one of two types, namely, broadcast type or point-to-point type.

Broadcast systems have a single communications channel that is shared by all the machines on the network. When a message (also known as a "packet") is sent on the broadcast system, all machines receive the packet. An address field within the packet specifies the destination machine. If the destination address does not match a particular machine's address, the machine ignores the packet. When the address matches the receiving machine's address, the packet is received.

A point-to-point system typically involves a number of hardwire transmission lines, each one connecting a pair of switching elements or hosts. One standard for utilizing a point-to-point system subnet is known as a "token ring" system (IEEE standard 802.5). Ring networks have many advantages. A ring system is substantially digital, improving communications, reliability and integrity. A ring also has a known upper limit for channel access and has limited contention problems.

In a token ring network, a special bit pattern, known as the "token," circulates around the ring. When a station wishes to transmit, it "seizes" the token, that is, removes it from the ring. That station is then free to transmit a packet. Because there is only one token on the ring, only one station can transmit at a time, eliminating contention problems. After the message has been propagated around the ring, the sending station removes it from the ring. After the message has been removed, the sending station retransmits the token so that another station may send if desired.

It is highly desirable to monitor the performance of an installed token ring network. By monitoring parameters such as physical ring delay, token rotation, bandwidth utilization, and others, a network administrator can optimize utilization of the network, identify and locate problems and plan expansion. The information generated from on-line analysis and monitoring permits trouble-shooting by the network administrator as well.

In the prior art, network monitors have been limited to monitoring "conversations," that is, packet data transmissions. These systems function only at the mid and upper levels of the network hierarchy. One disadvantage of these prior art monitors is the inability to capture all information transmitted on the network. For example, prior art systems do not capture tokens, token aborts or other low-level information. This prevents the generation of accurate utilization data. Another disadvantage is a reliance on the host or switching station for intelligence. This burdens the processing power of the host and limits the performance of the monitor.

Typically, prior art monitoring schemes utilize existing hardware designed to implement the network protocol. Because the heart of these prior art monitors are designed for a different purpose, the monitor is not able to execute desired monitoring functions. It is desired to have a network monitor which can function at each level of the network hierarchy, obtain all transmitted messages, permit simulations and utilization analysis.

Therefore, it is an object of the present invention to provide a method and apparatus for network monitoring which provides for complete data capture.

It is another object of the present invention to provide a method and apparatus for network monitoring which can operate at all levels of the network hierarchy.

It is still another object of the present invention to provide a method and apparatus for network monitoring that permits simulation of network activity and generation of controlled amounts of traffic.

SUMMARY OF THE PRESENT INVENTION

The present invention provides a method and apparatus for analyzing and monitoring network activity. The invention is capable of providing full data capture for complete monitoring capability and also permits the simulated generation of traffic up to network capacity.

The method and apparatus of the present invention allows for the use of pre-defined or custom-designed network tests so that users can analyze protocols and trouble-shoot network problems at various levels. Although full data capture is possible, the user may also customize the system to capture only certain packets of information.

The present invention accesses the token ring network through a ring interface. The output of the ring interface is coupled to a media access control (MAC) block. The MAC block includes a memory for packet buffering and is coupled to the primary memory, which is coupled to the host interface. The output of the ring interface is also coupled to a serial state machine. The serial state machine is used for high speed decoding of packet information. The output of the serial state machine is coupled to a series of timers and filters tracking information from the data stream. An on-board CPU controls the timers and is coupled to the primary memory.

BRIEF DESCRIPTION OF THE DRAWINGS

FIG. 3 is a block diagram illustrating a detailed view of the timers of FIG. 2.

FIG. 5 is an illustration of a token for a token ring network.

FIG. 6 illustrates a data frame of a token ring network.

FIG. 7 is a flow chart of the activity of the serial state machine.

DETAILED DESCRIPTION OF THE PRESENT INVENTION

The invention is directed to a method and apparatus for monitoring and analyzing activity on a computer network. In the following description, numerous specific details, such as number of timers, memory size, etc., are described in order to provide a more thorough description of the present invention. It will be apparent, however, to one skilled in the art, that the present invention may be practiced without these specific details. In other instances, well-known features have not been described so as not to obscure the present invention.

The invention provides apparatus for monitoring a computer network. The serial bit stream of data is taken from the token ring network through a ring interface. A state machine is coupled to the output of the ring interface and provides a plurality of output signals, each output signal being dependent on detection of specific data types in the serial bit stream. Timers and filters coupled to the output of the state machine track the timing and count of certain events and data types. A processing means receives output from the timer and is also coupled to a memory means for storing information and data concerning the analysis.

DESCRIPTION OF THE TOKEN RING NETWORK

Figure 1:
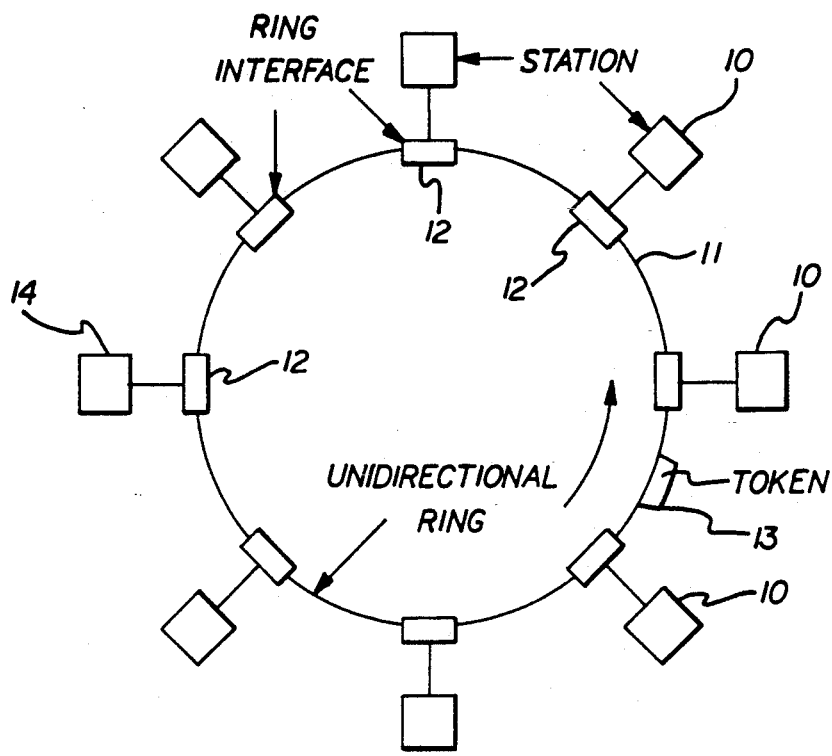
FIG. 1 is a block diagram of a token ring network.

An example of a token ring network is illustrated in FIG. 1. As the name implies, a token ring network is a closed loop. A plurality of stations 10 are each coupled to the ring 11 through a ring interface 12. Each station may include a ring controller to handle communications so that each station conforms to the complex network protocol. A token 13 (shown symbolically in FIG. 1) rotates about the ring 11 in a unidirectional fashion.

A monitor/analyzer 14 of the present invention is coupled to the ring 11 through an interface 12. Because the analyzer 14 has direct access to the network, full data capture can be achieved. In addition, the invention provides its own intelligence through an on-board CPU, not relying on the processing power of another host for monitoring and analysis.

Token

An example of a token format for use in a token ring network is illustrated in FIG. 5. The token is a 3-byte string comprising a start delimiter (SD) 15, an access control (AC) byte 16 and an end delimiter (ED) 17. The start delimiter 15 and end delimiter 17 define the beginning and end of the token frame. Generally, the SD 15 and ED 17 contain invalid differential manchester patterns (HH and LL) to distinguish these bytes from data bytes.

The access control byte 16 includes a bit which is normally set to 0 when the token is circling the ring. When a station seizes the token, this bit is set to 1 to convert the SD and AC bytes, 15 and 16, to a starter frame sequence, permitting a data frame to be transmitted by the seizing station.

The AC byte 16 may also include a field for indicating token priority. In one token ring scheme, each station is given a priority number. A station may then only capture a token whose priority is less than or equal to that station's assigned priority.

Data Frame

A data frame format of a token ring network is illustrated in FIG. 6. The data frame consists of a start delimiter byte 15 and access control byte 16. The access control byte has a bit set so that it indicates a data frame instead of a token. The access control byte is followed by a frame control (FC) byte 18, a two or six byte destination address 19 and a two or six byte source address 20. The address information is followed by a variable length data field 21, a four byte check sum field 22 and end delimiter byte 17. For a data frame, the end delimiter 17 is followed by a frame status byte 23.

The frame control byte 18 is used to identify various frames and to distinguish data frames from other control frames. As the name implies, the destination address 19 identifies the station to receive the data frame. The source address 20 identifies the sending station.

In the IEEE 802.5 protocol, the only limit on the data field 21 is the ability to transmit a frame within the token holding time. The data field can be up to 4K at 4 Mbits/second and 18K at 16 Mbits/second. The check sum field 22 is used for error detection. The frame status byte 23 is used for automatic acknowledgement of frame information. The frame status field 23 utilizes 2 bits to indicate three possible states as follows: 1. destination not present or not powered up; 2. destination present but frame not accepted; and 3. destination present and frame copied.

When a message is terminated prior to complete transmission, an "abort" sequence is transmitted on the ring. The abort sequence consists of a start delimiter 15 followed immediately by an end delimiter 17.

Transmission Symbols

The token, abort and data frame sequences are made up of "symbols" decoded from the serial data stream being transmitted on the token ring. The serial data stream is a series of signals of positive or negative polarity. The sequence of occurrence of these signals is used to define the symbols known as logical 1, logical 0, J and K. In the token ring protocol, these symbols are defined as follows:

Logical 1—The polarity of the leading signal of an element is the same as the trailing element of the preceding signal.

Logical 0—The polarity of the leading signal is the opposite of the trailing signal of the preceding element.

J— The bit is the same polarity as the preceding symbol.

K— The bit is the opposite polarity of the preceding symbol.

A start delimiter is defined by the sequence of symbols JK0JK000. An end delimiter consists of the sequence of symbols JK1JK1IE. (I is an intermediate bit and E is an error-detected bit.)

Figure 8:
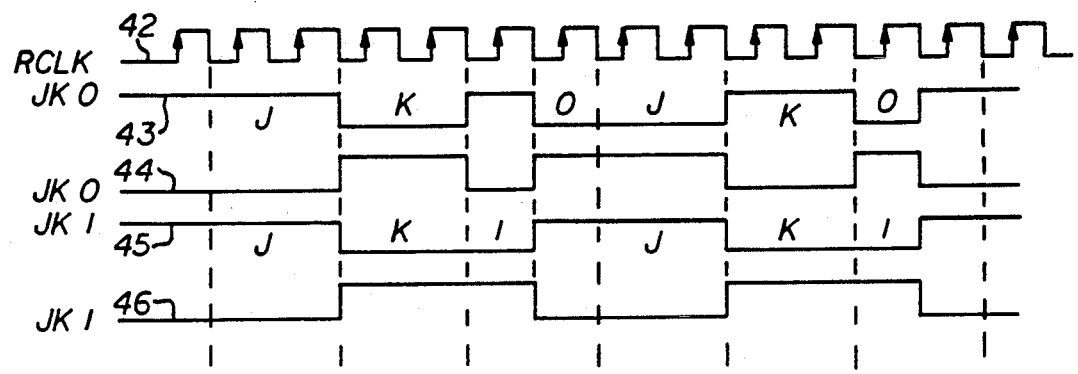
FIG. 8 is a timing diagram illustrating symbol definition in the present invention.

A timing diagram illustrating certain symbol groupings is illustrated in FIG. 8. The clock 42 is an 8 megahertz rising-edge clock. JK0 is defined by either of lines 43 and 44. Referring first to line 43, the first two symbols are the same polarity, meeting the definition of a symbol J. The next pair of symbols has a polarity transition, defining a symbol K. In the next window, the polarity of the leading signal is opposite that of the preceding trailing element, defining a logical 0. Following the logical 0, the polarity does not change, defining the symbol J. The next element is of opposite polarity so that a symbol K is defined. A JK0 series is also defined by timing line 44 which is the inverse of timing line 43.

A JK1 is defined by either of timing lines 45 and 46. Referring first to timing line 45, the first two symbols are of the same polarity so that the symbol J is defined. The polarity transition defines a symbol K. The polarity of the leading signal of the next element is the same as the preceding trailing element, defining a logical 1. Line 46 also defines a JK1 series and is the inverse of line 45.

NETWORK ANALYZER

Figure 2:
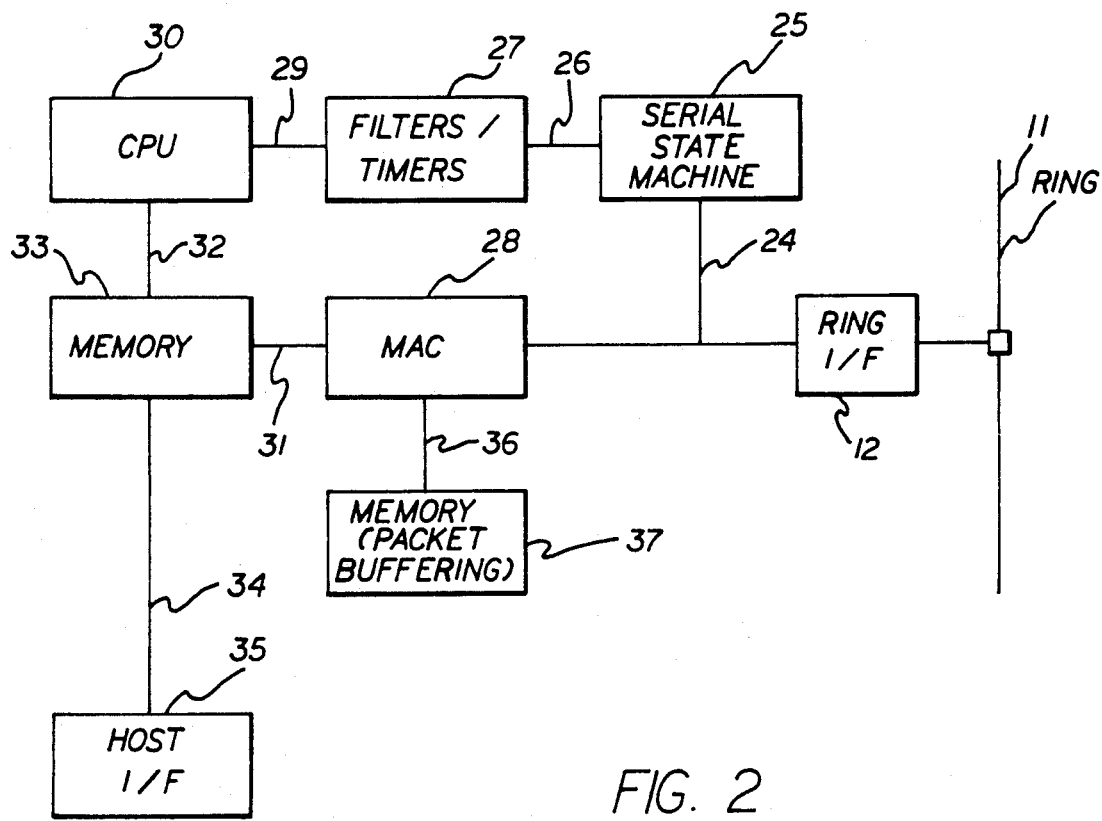
FIG. 2 is a block diagram of the preferred embodiment of the present invention.

A preferred embodiment of the present invention is illustrated in FIG. 2. The monitor 14 is coupled to the network ring 11 through a ring interface 12. The output 24 of the ring interface 12 is coupled to a MAC block 28 and serial state machine 25. The output of the serial state machine 26 is coupled to the filter/timer block 27. The output 29 of the filter/timer block is coupled to CPU 30. The MAC block 28 provides output 36 to packet-buffering memory 37 and output 31 to memory 33. Memory 33 is also coupled on line 32 to CPU 30. Memory 33 communicates on line 34 to host interface 35.

The ring interface consists of a 1-bit buffer which copies each bit of the serial bit stream. The copying step introduces a 1-bit delay at each interface. The buffer bit can be inspected and/or modified before it is rewritten to the ring. In the present case, each bit can be captured.

The MAC 28 acts as the network controller for each station, implementing the IEEE 802.5 protocol. The MAC 28 may be implemented with a network controller made by Texas Instruments, part number TI TMS 38010 communications processor and 38021 Protocol Handler. The MAC 28 decodes conversations on the token ring in the form of protocol data units (PDU's). The MAC 28 is designed to manage information related to the maintenance and control of the ring. Therefore, not all data on the ring is forwarded by the MAC 28. For example, tokens and aborts are not passed through the MAC 28 to the shared memory 33. Further, the MAC 28 can not be used to determine token rotation time or network bandwidth utilization.

The packet buffer memory 37 stores PDU's decoded by the MAC 28. Eventually, the PDU's are provided to shared memory 33 where they can be accessed by CPU 30. The CPU 30 is an 80286 processor, of the type manufactured by Intel. The present invention may be implemented in one embodiment without the MAC 28 and buffer memory 37. (In that embodiment, the output of the ring interface is coupled directly to the serial state machine 25.)

The output 24 of ring interface 12 is also provided to the serial state machine 25. The function of the serial state machine is to decode symbols, fields and frames to produce outputs representing ring events. For example, the serial state machine 25 can output "token detected," "abort detected," "carrier sense," data frames, etc. The output 26 of the serial state machine 25 is provided to the filter/timer block 27. Although full data capture can be achieved with this invention, the filter/timer block 27 is used to selectively transmit desired information to the user. The filter/timer block 27 is coupled on line 29 to CPU 30 which controls the operation of the invention. The CPU 30 is coupled on line 32 to shared memory 33.

A flow chart illustrating the operation of the serial state machine 25 is illustrated in FIG. 7. The serial-bit stream is provided to the serial state machine. At step 38, the serial state machine decodes symbols, such as J, K, 0 and 1. The symbols and combinations of symbols are then decoded to determine the fields, such as start delimiter, access control, end delimiter, frame status, data, source address, destination address, etc., at step 39. Once the fields have been decoded, frames can be identified at step 40, such as a token, PDU, or abort. Finally, at step 41, the serial state machine produces output such as token detected, abort detected, or "carrier sense," meaning information is being passed, i.e., a PDU. These outputs are provided to the filter/timer block 27.

Serial State Machine

Figure 4:
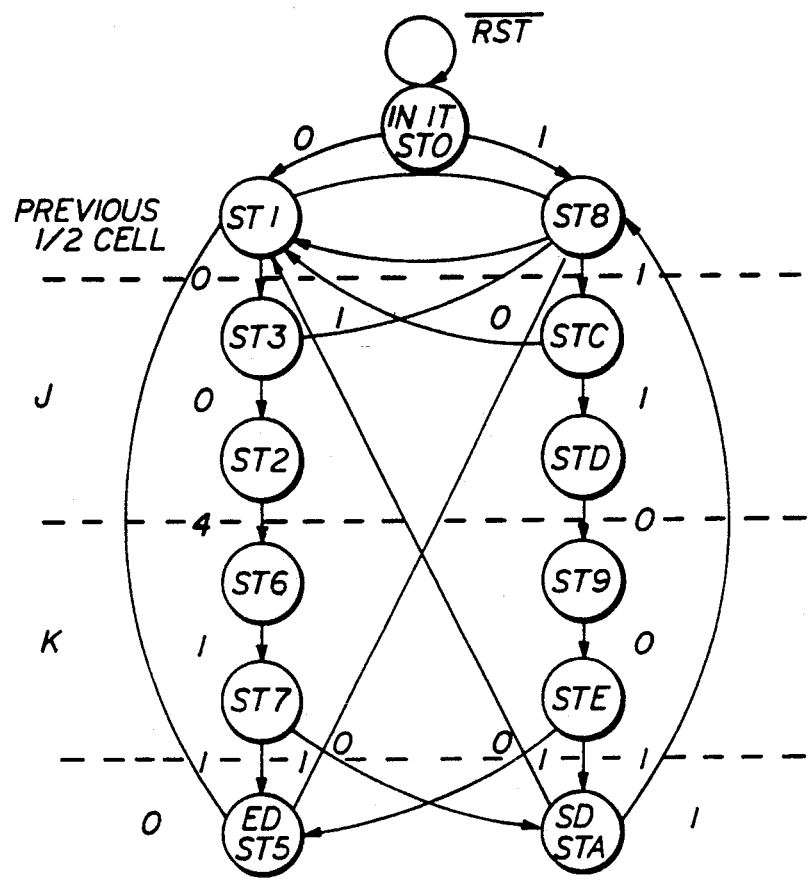
FIG. 4 is a block diagram illustrating a detailed view of the serial state machine of FIG. 2.

The serial state machine provides a means to decode the symbols of the serial data stream at an extremely high rate of speed, sufficient to provide full capture of the data in the stream. The state machine is an event-driven system in which sequences of events force the state machine into one or more particular states indicative of the sequence of events. A symbolic representation of the state machine is illustrated in FIG. 4. In FIG. 4, the states are indicated by circles labeled ST1, ST3, ST4, etc. The state machine is driven by 1's and 0's in the serial data stream. In the following description, we refer to the state machine as being "moved" from one state to another. By that, we mean that a sequence of events has occurred which caused the current state of the state machine to be changed from one state to another. Arrows are used to connect the state symbols to indicate the transition from state to state. The state transitions need not be sequential. Because the state machine can change state with each input of the serial data stream, full data capture is possible.

The initial state of the state machine is state 0. A logical 0 in the serial-bit stream moves the state machine from state 0 to state 1. A logical 1 moves the state machine from state 0 to state 8. States 1 and 8 define the previous one-half cell which is used to aid in defining J and K symbols.

At state 1, a logical 1 advances the machine to state 8. A logical 0 advances the state machine from state 1 to state 3 and defines the symbol J. A transition at state 3 from a logical 0 to a logical 1 moves the state machine back to state 8. A repetition of the same symbol, a logical 0, moves the machine from state 3 to state 2 which is also the symbol J.

At state 2, a logical 1 advances the state machine from state 2 to state 6 defining a symbol K. At logical 1 at state 6 moves the machine from state 6 to state 7, also a symbol K. From state 7, a logical 0 moves the machine to state A, which is a start delimiter (JK0). A logical 1 at state 7 advances the state machine from state 7 to state 5, which is an end delimiter (JK1).

At state 5, a logical 1 advances the state machine from state 5 to state 8 and a logical 0 returns it to state 1. At state A, a logical 0 returns the state machine to state 1 and a logical 1 advances it from state A to state 8.

At state 8, a logical 1 advances the state machine from state 8 to state C defining a symbol J. A logical 0 returns the state machine from state 8 to state 1. At state C, a logical 1 advances the state machine from state C to state D, also a symbol J. A logical 0 at state D advances the state machine from state D to state 9, which is a symbol K. A logical 0 at state 9 advances the machine from state 9 to state E, also a symbol K. At state E, a logical 0 advances the state machine from state E to state 5, which is an end delimiter. A logical 1 advances the state machine from state E to state A, which is a start delimiter.

In summary, states 1 and 8 define previous half cells. States 2, 3, C and D define the symbol J; states 6, 7, 9 and E define symbol K; state 5 defines an end delimiter, and state A defines a start delimiter.

Filter/Timer

The filter/timer block 27 is shown in detail in FIG. 3. The output 26 from the state machine, the decoded symbols and fields, is provided to a number of filters for extracting information from the raw data. In the preferred embodiment of the present invention, there are three filters; a token filter 48, an abort filter 49 and a packet data filter 50. The output 51 of the token filter 48 is coupled to the token timer 54. The abort filter 49 provides output 52 to the abort timer 55. The packet data filter 50 outputs signal 53 to carrier-sense timer 56. The output 29 of timers 47, 54, 55 and 56 is coupled to the CPU 30. When the token filter 48 detects the 24-bit token (start-delimiter frame, access-control frame, and end-delimiter frame), it provides output 51 to token timer 54. Token timer 54 is used to count the occurrence of a timing of tokens on the token ring.

The abort filter 49 provides an output signal 52 when it detects the abort sequence (start-delimiter frame and end-delimiter frame). This triggers the abort timer 55 to track the occurrence and timing of aborts on the network.

When the data frame format is detected by data-packet filter 50, an output signal 53 is provided to carrier-sense timer 56. The carrier-sense timer 56 is similar to a stopwatch in that it is running only when packet data information is being passed on the network. This timer 56 tracks the total time used for sending messages. The output of the timers is provided to the CPU to determine network utilization parameters.

The clock timer 47 is used to define sampling periods which, in the preferred embodiment of the present invention, are typically approximately 1 second in duration. The timer 47 also determines when and/or for how long an event takes place. In the preferred embodiment, event resolution is typically approximately 0.5 microseconds.

CPU

The CPU 30 is used to calculate several parameters concerning network usage, such as token rotation time, network utilization, ring delay, bandwidth utilization, etc. The CPU receives the number of samples of tokens, aborts and PDU's, as well as the timing of the sample period from the filters/timers block 27. Using algorithms described below, the CPU generates network utilization parameters. One important factor of network use is network utilization which is determined by the following formula:

Network utilization (%) =

[(data time) − M(abort time) − N(token time)]/sample period where data time equals the amount of time in the sample period used for data transmission;
abort time equals the amount of time in the sample period for aborts;
token time equals the amount of time in the sample period used by tokens;

and M and N are constants.

Thus, the data time is provided by timer 56, the abort time and token time are provided by timers 55 and 54, respectively. Thus, the above formula determines what percentage of the time the network is utilized to send data. This is the ratio of the time the carrier is present to the total sample time, with adjustments for the time taken by tokens and aborts.

The average token rotation time is the number of tokens observed during the sampling period divided by the sampling period. The number of tokens is provided by token timer 54.

Ring delay can be detected by determining the time from an end delimiter to the start delimiter of the next packet. Once ring delay as known, bandwidth calculation can be determined. Bandwidth use is the time PDU's are on the ring and is determined by the total time minus the token time minus abort time minus ring delay time.

Token rotation time indicates how fast the network is moving or if the network network is becoming saturated. Network utilization reveals how much network bandwidth is being used and whether there's a need to partition into two networks.

The timers of FIG. 3 are implemented with counters. The output signals of the filter enable the counters. When the output is true, the counters count to keep a running total of the number of tokens, aborts and packet-data time. When the output is false, the counters stop counting.

Network traffic may be generated by the CPU under the direction of the user. The content of the packet is user specified. The level of traffic is also user specified. Software executed by the CPU builds the appropriate data structures in memory (33) and directs the MAC to transmit the packet contained in those data structures. Generated traffic may consist of a single packet transmission or continuous transmission to produce a fixed network load.

Thus, a method and apparatus for analyzing and monitoring computer networks is described.

We claim:

1. A circuit for monitoring a token ring network having a token circulating on a ring comprising:
    interface means coupled to said ring for receiving signals from said ring, said interface means providing a first output;
    converting means coupled to said first output for converting said first output to one of a plurality of symbols, said converting means providing a second output;
    detecting means coupled to said second output for detecting combinations of said plurality of symbols, said detecting means providing a plurality of third outputs, each of said outputs representing one of a plurality of combinations of said symbols; and
    network utilization determining means coupled to said plurality of third outputs for determining network performance by calculating network utilization parameters of network utilization token rotation time, ring delay, and bandwidth utilization based on integration of said plurality of third outputs over time.

2. The circuit of claim 1 wherein said converting means comprises a serial state machine.

3. The circuit of claim 1 wherein said detecting means comprises a plurality of filters.

4. The circuit of claim 1 further including a media access control (MAC) block coupled to said interface means to manage information related to maintenance and control of said network.

5. A method for monitoring a token ring network having a token circulating on a ring comprising the steps of:
   receiving a serial data stream from said ring;
   converting and identifying symbols in said serial data stream;
   detecting a plurality of combinations of said symbols;
   counting individual occurrences of each of said plurality of combinations of said symbols; and
   determining network performance by calculating network utilization parameters of network utilization, token rotation time, ring delay, and bandwidth utilization based on integration of said individual occurrences over time.

6. The method of claim 5 wherein the step of receiving a serial data stream from said ring is performed through a ring interface coupled to said ring.

7. The method of claim 5 wherein said step of converting and identifying symbols in said serial data stream is performed by providing said serial data stream to a serial state machine.

8. The method of claim 5 wherein said step of detecting a plurality of combinations of said symbols is performed by providing said symbols to a plurality of filters and timers.

9. A circuit for monitoring a token ring network having a serial data stream transmitted on a ring in accordance with a network protocol comprising:
   receiving means coupled to said ring for receiving said serial data stream and for providing said serial data stream as a first output;
   control means coupled to said first output, said control means for detecting data in said serial data stream, said control means for implementing said network protocol, said control means providing a second output;
   converting means coupled to said first output for converting said first output to one of a plurality of symbols, said converting means providing a third output;
   detecting means coupled to said third output for detecting combinations of said pluralities of symbols, said detecting means providing a plurality of fourth outputs, each of said fourth outputs representing one of a plurality of combinations of said symbols; and
   network utilization determining means coupled to said plurality of fourth outputs for determining network performance by calculating network utilization parameters of network utilization, token rotation time, ring delay, and bandwidth utilization based on integration of said plurality of fourth outputs over time, said network utilization determining means coupled to a memory means;
   said memory means coupled to said second output.

10. The circuit of claim 9 wherein said receiving means comprises a ring interface.

11. The circuit of claim 10 wherein said control means comprises a media access control (MAC) block.

12. The circuit of claim 9 wherein said converting means comprises a serial state machine.

13. The circuit of claim 9 wherein said detecting means comprises a plurality of filters and timers.

14. The circuit of claim 9 wherein said network protocol comprises an IEEE standard protocol known as "the 802.5 token ring proposal".

* * * * *